(12) United States Patent
Choi et al.

(10) Patent No.: US 6,927,933 B2
(45) Date of Patent: Aug. 9, 2005

(54) APPARATUS CONFIGURED FOR APPLYING WRITE SIGNALS FOR DRIVING A WRITE HEAD AND METHOD FOR CONFIGURING

(75) Inventors: Davy H. Choi, Garland, TX (US); Chuanyang Wang, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 10/405,386

(22) Filed: Apr. 2, 2003

(65) Prior Publication Data

US 2004/0196585 A1 Oct. 7, 2004

(51) Int. Cl.⁷ .......................... G11B 5/02; G11B 19/04
(52) U.S. Cl. ................. 360/68; 360/60; 360/67
(58) Field of Search .................. 327/107, 108; 360/60, 66, 67, 68

(56) References Cited

U.S. PATENT DOCUMENTS

| | | | | |
|---|---|---|---|---|
| 5,247,398 A | * | 9/1993 | Sidman | 360/75 |
| 5,570,241 A | * | 10/1996 | Nielsen et al. | 360/68 |
| 5,612,828 A | * | 3/1997 | Brannon et al. | 360/68 |
| 6,175,463 B1 | * | 1/2001 | Nayebi et al. | 360/68 |
| 6,285,221 B1 | * | 9/2001 | Leighton et al. | 327/110 |
| 6,512,649 B1 | * | 1/2003 | Alini et al. | 360/68 |
| 6,583,946 B1 | * | 6/2003 | Emerson | 360/66 |
| 6,624,957 B1 | * | 9/2003 | Yun | 360/66 |
| 6,687,064 B1 | * | 2/2004 | Jiang et al. | 360/68 |

* cited by examiner

Primary Examiner—David Hudspeth
Assistant Examiner—Glenda P. Rodriguez
(74) Attorney, Agent, or Firm—W. Daniel Swayze, Jr.; W. James Brady; Frederick J. Telecky, Jr.

(57) ABSTRACT

An apparatus configured according to characteristics for driving a write head to write to a memory device includes: (a) a current directing circuit directing a write current through a first circuit path or a second including the write head in response to a first or second write signal; (b) at least one of: (1) an impedance system for including at least one impedance unit within each of the first and second current paths; and (2) a current system for including at least one circuit element between a locus at each end of said write head and a supply voltage; and (c) a control unit coupled with at least one of the impedance system and the current system for effecting the including for at least one of the impedance system and the current system to effect configuring the apparatus.

20 Claims, 4 Drawing Sheets

APPARATUS CONFIGURED FOR APPLYING WRITE SIGNALS FOR DRIVING A WRITE HEAD AND METHOD FOR CONFIGURING

BACKGROUND OF THE INVENTION

The present invention is directed to write driving apparatuses and methods associated with memory devices. In particular, the present invention is directed to a write driver apparatus that is constructed to accommodate configuring according to various predetermined operational criteria, and directed to a method for effecting such configuring.

During the writing of information to a storage medium such as a magnetic disk in an electromagnetic storage device a write current ($I_W$) is supplied, generally by a preamplifier apparatus, to a write head that is situated adjacent to the magnetic disk. The polarity of write current $I_W$ passing through the write head (i.e., the direction of travel of the write current) influences magnetic properties in the magnetic disk and effects storage of digital information in the disk. In addition to a steady-state write current $I_W$, it is desirable to have additional current available during the transition toward steady state $I_W$ to assure a successful write operation. Such extra current above steady state write current $I_W$ is called boost current $I_{BST}$ and is preferably supplied only during periods in which write current $I_W$ is transitioning from one current level, or value, to another current level. Applying boost current $I_{BST}$ usually results in write current $I_W$ momentarily going beyond its steady state current level, a condition known as overshoot.

The load seen by a preamplifier device associated with a write device is a complex load (representing the write head and interconnections between the write head and the preamplifier) so that some ringing is typically present as write current returns to its steady state level $I_W$ from an overshoot condition. One method of reducing ringing is to introduce some damping at the input to the writer head, such as by introducing an output resistance $R_{OUT}$ at the locus to which the writer head is connected. Output resistance $R_{OUT}$ can be installed either connected in series or in parallel with the writer load.

Different manufacturers of electromagnetic storage products require different operational characteristics for write apparatuses they employ in their respective products. A manufacturer of component write apparatuses (commonly and preferably embodied in assemblies known as head stack assemblies) for use by product manufacturers needs to match the requisite parametric requirements of various customer-producers. In meeting the various operational parametric requirements there are opposite tendencies among various parameters that must be accommodated.

For example, a larger value for output resistance $R_{OUT}$ is best when one seeks to employ a lower write current $I_W$. In such conditions, overshoot is easily attained because of the lower value of write current $I_W$. There is no need for a large boost current $I_{BST}$. In contrast, a lesser output resistance $R_{OUT}$ and a larger boost current $I_{BST}$ are best when one uses a higher value for write current $I_W$. Larger boost current $I_{BST}$ is necessary as its value scales up with $I_W$ to provide a desired $I_{BST}/I_W$ ratio at a higher write current $I_W$ setting. Output resistance $R_{OUT}$ may be reduced to minimize loss of voltage headroom (i.e., "running into the upper rail"; approaching the upper supply voltage level), since loss of voltage headroom causes reduction of overshoot. Thus, the requirements for boost current $I_{BST}$ and output resistance $R_{OUT}$ urge parameters $R_{OUT}$, $I_{BST}$ in opposite directions to seek to achieve a particular operating value for write current $I_W$: lower write current $I_W$ urges higher output resistance $R_{OUT}$ and lower boost current $I_{BST}$, higher write current $I_W$ urges lower output resistance $R_{OUT}$ and higher boost current $I_{BST}$. Some prior art write apparatuses provided for programmable boost current $I_{BST}$. Some prior art write apparatuses provided for programmable output resistance $R_{OUT}$. However, programming of the respective parameters boost current $I_{BST}$ and output resistance $R_{OUT}$ was accomplished using separate control units, such as separate digital-to-analog converter (DAC) units.

The inventor had observed that complete control of the parameters output resistance $R_{OUT}$ and boost current $I_{BST}$ does not need to be effected to configure a write apparatus for optimal performance using a variety of values of write current $I_W$. That is, one need only control situations in which one of parameters $R_{OUT}$, $I_{BST}$ is increased while the other of parameters $R_{OUT}$, $I_{BST}$ is decreased, or vice versa. No provision needs to be made for increasing or decreasing both of parameters $R_{OUT}$, $I_{BST}$ together. Programming coverage needs only to address two quadrants (i.e., one quadrant: $R_{OUT}$ increases, $I_{BST}$ decreases or another quadrant: $I_{BST}$ increases, $R_{OUT}$ decreases) of parameter variations. The remaining two quadrants (i.e., one quadrant: $R_{OUT}$ increases, $I_{BST}$ increases or another quadrant: $R_{OUT}$ decreases, $I_{BST}$ decreases) do not contribute to desired performance by a write apparatus. The remaining two quadrants may therefore be ignored. Providing a single control apparatus for affecting selected circuit parameters to configure a write apparatus for desired operational characteristics lowers parts count for the write apparatus while increasing its flexibility to meet varied requirements of customer-producers. Lower parts count yields several advantages, including by way of example and not by way of limitation, occupying less board space, increased reliability (i.e., fewer parts to break down), lesser power consumption and other efficiencies.

If no programmability of parameters was provided or if only one parameter was programmable, manufacturers of prior art write apparatuses had to produce a number of different apparatuses in order to accommodate differing operational parameters for various customer-producers. Having to produce several specially configured products prevents a manufacturer from enjoying some advantages that can be realized by economies of scale attending large volume manufacturing operations.

There is a need for a single write apparatus, such as a head stack assembly providing a preamplifier device and an associated write head, that can be configured to conform to a variety of predetermined operational characteristics, and a method for effecting such configuring.

There is a need for a single control apparatus for affecting selected circuit parameters to configure a write apparatus for desired operational characteristics.

SUMMARY OF THE INVENTION

An apparatus configured according to characteristics for driving a write head to write to a memory device includes: (a) a current directing circuit directing a write current through a first circuit path or a second including the write head in response to a first or second write signal; (b) at least one of: (1) an impedance system for including at least one impedance unit within each of the first and second current paths; and (2) a current system for including at least one circuit element between a locus at each end of said write head and a supply voltage; and (c) a control unit coupled with at least one of the impedance system and the current system for effecting the including for at least one of the impedance system and the current system to effect configuring the apparatus.

A method for configuring an apparatus according to predetermined operational characteristics for applying a first write signal and a second write signal for driving a write head coupled between a first head locus and a second head locus to effect writing information to a memory device; the apparatus including a current directing circuit for directing a write current from a first voltage supply through a first circuit path including the write head in response to the first write signal, and directing the write current from the first voltage supply through a second current path including the write head in response to the second write signal; includes the steps of: (a) in no particular order: (1) providing an impedance adjustment system including a first impedance unit and a second impedance unit; the first impedance unit including at least one first impedance device configured for including at least one selected first impedance unit of a plurality of first impedance units within the first current path; the second impedance unit including at least one second impedance device configured for including at least one selected second impedance unit of a plurality of second impedance units within the second current path; (2) providing a current adjustment system; the current adjustment system including a first current boost unit and a second current boost unit; the first current boost system being coupled between the first head locus and a second supply voltage lower than the first supply voltage; the first current boost system being configured for selectively including at least one selected first circuit element of a plurality of first circuit elements between the first head locus and the second supply voltage; the second current boost system being coupled between the second head locus and the second supply voltage; the second current boost system including at least one second circuit element configured for selectively including at least one selected second circuit element of a plurality of second circuit elements between the second head locus and the second supply voltage; and (3) providing a control unit coupled with at least one of the impedance adjustment system and the current adjustment system; (b) operating the control unit to generate control signals for effecting the selective including for at least one of the impedance adjustment system and the current adjustment system to effect the configuring.

It is, therefore, an object of the present invention to provide an apparatus for applying write signals for driving a write head that can be configured to conform to a variety of predetermined operational characteristics, and a method for configuring the apparatus.

It is a further object of the present invention to provide an apparatus for applying write signals for driving a write head that has a single control unit for affecting selected circuit parameters to configure the apparatus for desired operational characteristics.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
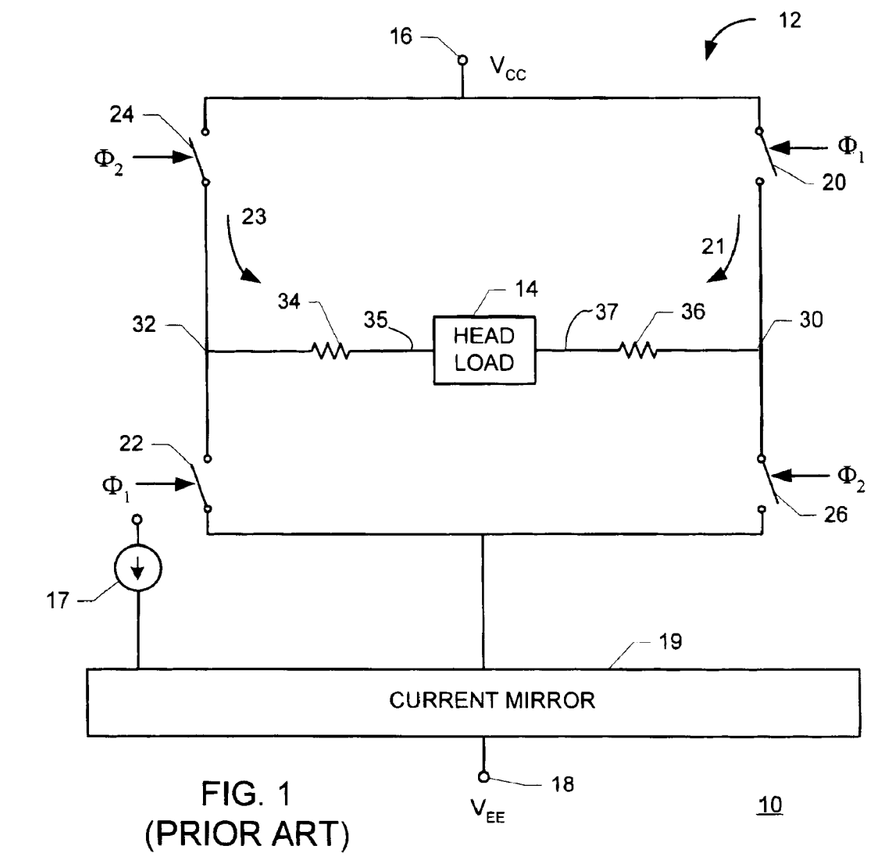
FIG. 1 is a simplified electrical schematic drawing of a representative prior art write signal drive circuit with an associated write head.

FIG. 1 is a simplified electrical schematic drawing of a representative prior art write signal drive circuit with an associated write head. In FIG. 1, a write drive system 10 includes a current directing circuit 12 coupled with a write head 14. Current directing circuit 12 is coupled between a first supply voltage $V_{CC}$ at a first supply locus 16 and a second supply voltage $V_{EE}$ at a second supply locus 18 via a current mirror unit 19. Current mirror unit 19 includes a reference current source 17. Preferably, second supply voltage $V_{EE}$ is a lower potential than first supply voltage $V_{CC}$. Current directing circuit 12 includes first switching elements 20, 22 and second switching elements 24, 26. First switching element 20 is coupled between first supply locus 16 and a circuit junction 30. First switching element 22 is coupled between second supply locus 18 and a circuit junction 32. Second switching element 24 is coupled between first supply locus 16 and circuit junction 32. Second switching element 26 is coupled between second supply locus 18 and circuit junction 30. A first impedance 34 is coupled between circuit junction 32 and a first head locus 35. A second impedance 36 is coupled between circuit junction 30 and a second head locus 37. Write head 14 is coupled between head loci 35, 37.

First switching elements 20, 22 respond to a signal $\Phi_1$ to close and complete an electrical circuit. When signal $\Phi_1$ is applied to first switching elements 20, 22 a first electrical path 21 is established from first supply locus 16 through first switching element 20, thorough second impedance 36, through write head 14, through first impedance 34 and through first switching element 22 to second supply locus 18 via current mirror unit 19. Second switching elements 24, 26 respond to a signal $\Phi_2$ to close and complete an electrical circuit. When signal $\Phi_2$ is applied to second switching elements 24, 26 a second electrical path 23 is established from first supply locus 16 through second switching element 24, thorough first impedance 34, through write head 14, through second impedance 36 and through second switching element 26 to second supply locus 18 via current mirror unit 19. Signals $\Phi_1$, $\Phi_2$ represent write signals provided from a preamplifier or similar device (not shown in FIG. 1) to effect changes in magnetic fields of a magnetic medium, such as a spinning magnetic disk adjacent to write head 14 (not shown in FIG. 1) to record information by such magnetic field changes. Signals $\Phi_1$, $\Phi_2$ may, for example, respectively represent a digital "0" and a digital "1" in their magnetic effect upon an adjacent magnetic medium.

Figure 2:
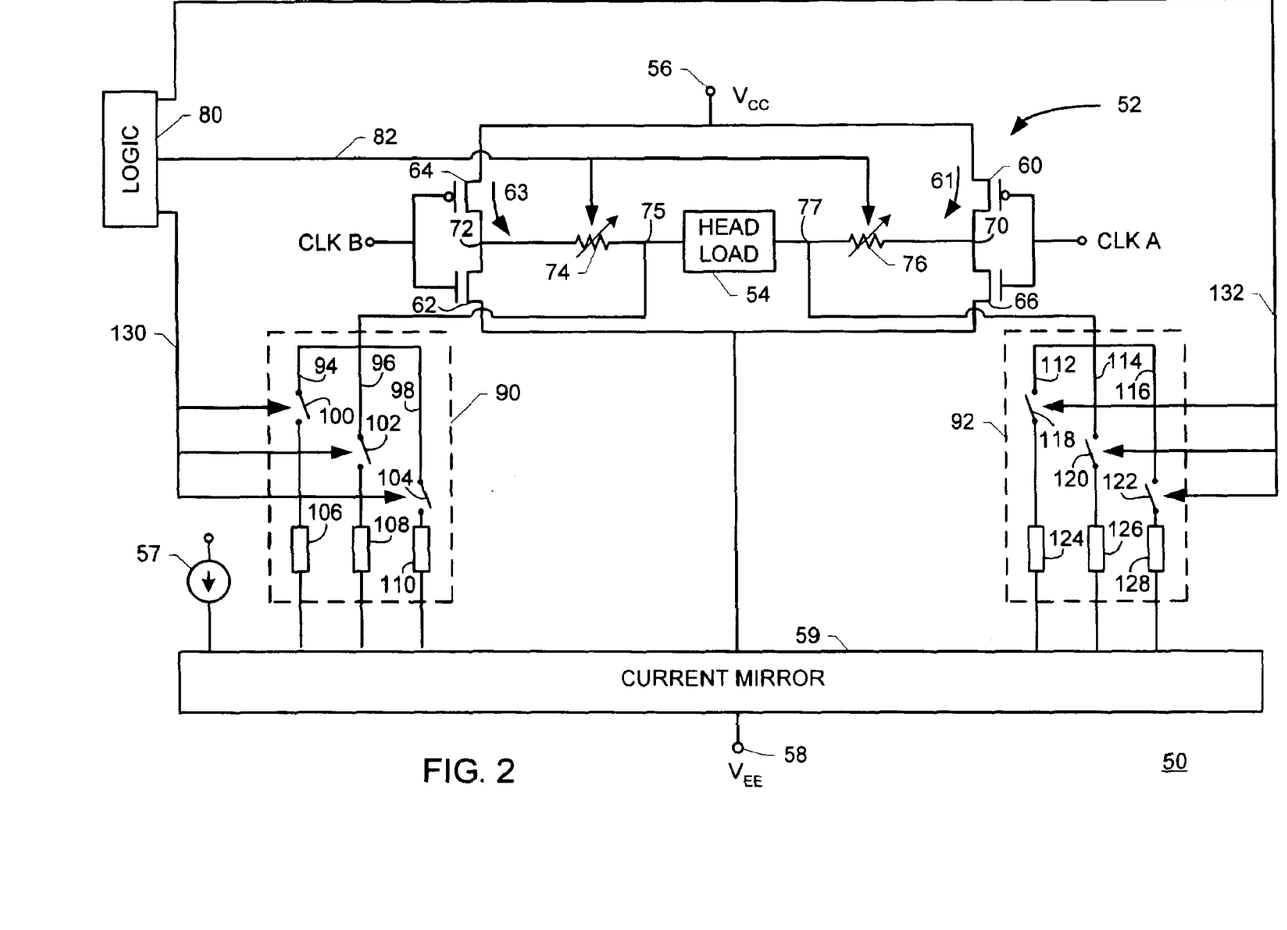
FIG. 2 is a simplified electrical schematic drawing of the apparatus of the present invention.

FIG. 2 is a simplified electrical schematic drawing of the apparatus of the present invention. In FIG. 2, a write drive system 50 includes a current directing circuit 52 coupled with a write head 54. Current directing circuit 52 is coupled between a first supply voltage $V_{CC}$ at a first supply locus 56 and a second supply voltage $V_{EE}$ at a second supply locus 58 via a current mirror unit 59. Current mirror unit 59 includes a reference current source 57. Preferably, second supply voltage $V_{EE}$ is a lower potential than first supply voltage $V_{CC}$. Current directing circuit 52 includes first switching elements 60, 62 and second switching elements 64, 66. First switching element 60 is coupled between first supply locus 56 and a circuit junction 70. First switching element 62 is coupled between second supply locus 58 and a circuit junction 72. Second switching element 64 is coupled between first supply locus 56 and circuit junction 72. Second switching element 66 is coupled between second supply locus 58 and circuit junction 70. A first impedance unit 74 is coupled between circuit junction 72 and a first head locus 75. A second impedance unit 76 is coupled between circuit junction 70 and a second head locus 77. Write head 54 is coupled between head loci 75, 77.

First switching element 60 and second switching element 66 are driven by a clock signal CLK A. First switching element 60 and second switching element 66 are configured to respond oppositely to driving signals so that whenever one of first switching element 60 and second switching element 66 closes to establish an electrical path in response to signal CLK A, the other of first switching element 60 and second switching element 66 is open to interrupt an electrical path. First switching element 62 and second switching element 64 are driven by a clock signal CLK B. First switching element 62 and second switching element 64 are configured to respond oppositely to driving signals so that whenever one of first switching element 62 and second switching element 64 closes to establish an electrical path in response to signal CLK B, the other of first switching element 62 and second switching element 64 is open to interrupt an electrical path. In such manner, current directing circuit 52 effectively responds to clock signals CLK A and CLK B as though responding to two write signals applied to switching elements 60, 62, 64, 66.

Impedance units 74, 76 are preferably variable impedances responding to control signals provided from a logic unit 80 via a control line 82 to establish operating impedances. Preferably logic unit 80 is a digital logic control unit that provides digital control signals. In such an embodiment an n-bit logic unit could distinguish up to $2^n$ control signals over each respective control line.

In an exemplary embodiment of write drive system 50 first switching element 60 responds to a negative excursion of signal CLK A, and first switching element 62 responds to a positive excursion of signal CLK B to close and complete an electrical circuit. Thus, when signal CLK A is negative and signal CLK B is positive a first electrical path 61 is established from first supply locus 56 through first switching element 60, through second impedance unit 76, through write head 54, through first impedance unit 74 and through first switching element 62 to second supply locus 58 via current mirror unit 59. Further in the exemplary embodiment second switching element 64 responds to a negative excursion of signal CLK B, and second switching element 66 responds to a positive excursion of signal CLK A to close and complete an electrical circuit. Thus, when signal CLK B is negative and signal CLK A is positive a second electrical path 63 is established from first supply locus 56 through second switching element 64, thorough first impedance unit 74, through write head 54, through second impedance unit 76 and through second switching element 66 to second supply locus 58 via current mirror unit 59. Preferably, clock signals CLK A, CLK B are substantially 180 degrees out of phase so that whenever one of clock signals CLK A, CLK B is in a positive excursion, the other of clock signals CLK A, CLK B is in a negative excursion.

Write drive system 50 also includes a first current adjustment unit 90 coupled between first head locus 75 and second supply locus 58 via current mirror unit 59, and a second current adjustment unit 92 coupled between second head locus 77 and second supply locus 58 via current mirror unit 59. First current adjustment unit 90 is preferably embodied in a current digital-to-analog converter unit including a plurality of parallel circuit segments 94, 96, 98. Each respective circuit segment 94, 96, 98 includes a switch unit controlling electrical connection of a circuit element. Circuit segment 94 includes a switch unit 100 in series with a circuit element 106. Circuit segment 96 includes a switch unit 102 in series with a circuit element 108. Circuit segment 98 includes a switch unit 104 in series with a circuit element 110. First current adjustment unit 90 may include more than or less than three circuit segments; three circuit segments 94, 96, 98 are shown in FIG. 2 by way of illustration and not by way of limitation. Second current adjustment unit 92 is preferably embodied in a current digital-to-analog converter unit including a plurality of parallel circuit segments 112, 114, 116. Each respective circuit segment 112, 114, 116 includes a switch unit controlling electrical connection of a circuit element. Circuit segment 112 includes a switch unit 118 in series with a circuit element 124. Circuit segment 114 includes a switch unit 120 in series with a circuit element 126. Circuit segment 116 includes a switch unit 122 in series with a circuit element 128. Second current adjustment unit 92 may include more than or less than three circuit segments; three circuit segments 112, 114, 116 are shown in FIG. 2 by way of illustration and not by way of limitation.

Switch units 100, 102, 104 respond to control signals provided from logic unit 80 via a control line 130. Switch units 118, 120, 122 respond to control signals provided from logic unit 80 via a control line 132. Preferably logic unit 80 is a digital logic control unit that provides digital control signals. In such an embodiment an n-bit logic unit could distinguish up to $2^n$ control signals over each respective control line. Thus, each of control lines 130, 132 may address and control individual switch units by a 2-bit digital control unit (i.e., $2^2=4$ control identities controlling three switch units). Alternatively, control lines 130, 132 could be combined into a single control line and each respective switch unit 100, 102, 104, 118, 120, 122 could be addressed and controlled individually by a 3-bit digital controller. In another alternate embodiment, predetermined combinations of positions of switch units 100, 102, 104, 118, 120, 122 and settings for impedance units 74, 76 may be established to effect electrical involvement of predetermined combinations of circuit elements and impedance levels in operating write driver unit 50 for control by a two-bit digital control unit. Selective activation of switch units 100, 102, 104, 118, 120, 122 in response to control signals from logic unit 80 effects selective inclusion of respective circuit elements 106, 108, 110, 124, 126, 128. Varying the arrangement of circuit elements 106, 108, 110, 124, 126, 128 coupled between first head locus 75 or second head locus 77 and second supply locus 58 varies the current draw through electrical paths 61, 63 depending upon the states of signals CLK A, CLK B.

Logic unit 80 may employ control signals delivered via control lines 82 (to impedance units 74, 76) and control lines 130, 132 (to current adjustment units 90, 92) to configure write drive system 50 to present predetermined operational parameters for inclusion of write drive system 50 in a product. Providing variable configuration for write drive system 50 permits a manufacturer to make a single part that can be configured (using logic unit 80) to accommodate operational requirements of a variety of customers desiring to employ write drive system 50 in products. An ability to manufacture a single part that can accommodate a variety of applications in products provides a part manufacturer with economies of scale advantages including less inventory, lower component part counts and other cost saving advantages.

Varying increments of impedance provided by impedance units 74, 76 in response to control signals from logic unit 80 provides further flexibility in configuring write drive system 50. That is, it is not required that incremental steps in variation of impedance provided by adjusting impedance unit 74, 76 be equal-magnitude steps. Similarly, varying increments of current flow provided by circuit elements 106, 108, 110, 124, 126, 128 in response to control signals from logic unit 80 provides flexibility in configuring write drive system 50. That is, it is not required that incremental steps in variation of current flow provided by adjusting arrangements of circuit elements 106, 108, 110, 124, 126, 128 be equal-magnitude steps.

The requirements for boost current $I_{BST}$ and output resistance $R_{OUT}$ urging parameters $R_{OUT}$, $I_{BST}$ in opposite directions to seek to achieve a particular operating value for write current $I_W$ may be accommodated by logic unit 80 selectively operating switch units 100, 102, 104, 118, 120, 122 to selectively include circuit elements 106, 108, 110, 124, 126 128 in write drive system 50 and by logic unit 80 selectively setting impedance units 74, 76 to configure write drive system 50 for optimal performance using a particular values of write current $I_W$. That is, logic unit 80 may establish circuit parameters of write drive system 50 to accommodate lower write current $I_W$ that urges higher output resistance $R_{OUT}$ and lower boost current $I_{BST}$, or to accommodate higher write current $I_W$ that urges lower output resistance $R_{OUT}$ and higher boost current $I_{BST}$. Complete control of parameters $R_{OUT}$, $I_{BST}$ does not need to be effected to configure write drive system 50 for optimal performance using a variety of values of write current $I_W$. Logic unit 80 only needs to control circuit parameter settings in which one of parameters $R_{OUT}$, $I_{BST}$ is increased while the other of parameters $R_{OUT}$, $I_{BST}$ is decreased, or in which one of parameters $R_{OUT}$, $I_{BST}$ is decreased while the other of parameters $R_{OUT}$, $I_{BST}$ is increased. Logic unit 80 does not need to be capable of increasing or decreasing both of parameters $R_{OUT}$, $I_{BST}$ together. Providing a single control apparatus such as logic unit 80 in operational cooperation with impedance units 74, 76 and with switch units 100, 102, 104, 118, 120, 122 to selectively include circuit elements 106, 108, 110, 124, 126 128) for affecting selected circuit parameters to configure write drive system 50 for desired operational characteristics lowers parts count for the write apparatus while increasing its flexibility to meet varied requirements of customer-producers. Lower parts count yields several advantages, including by way of example and not by way of limitation, occupying less board space, increased reliability (i.e., fewer parts to break down), lesser power consumption and other efficiencies.

Figure 3:
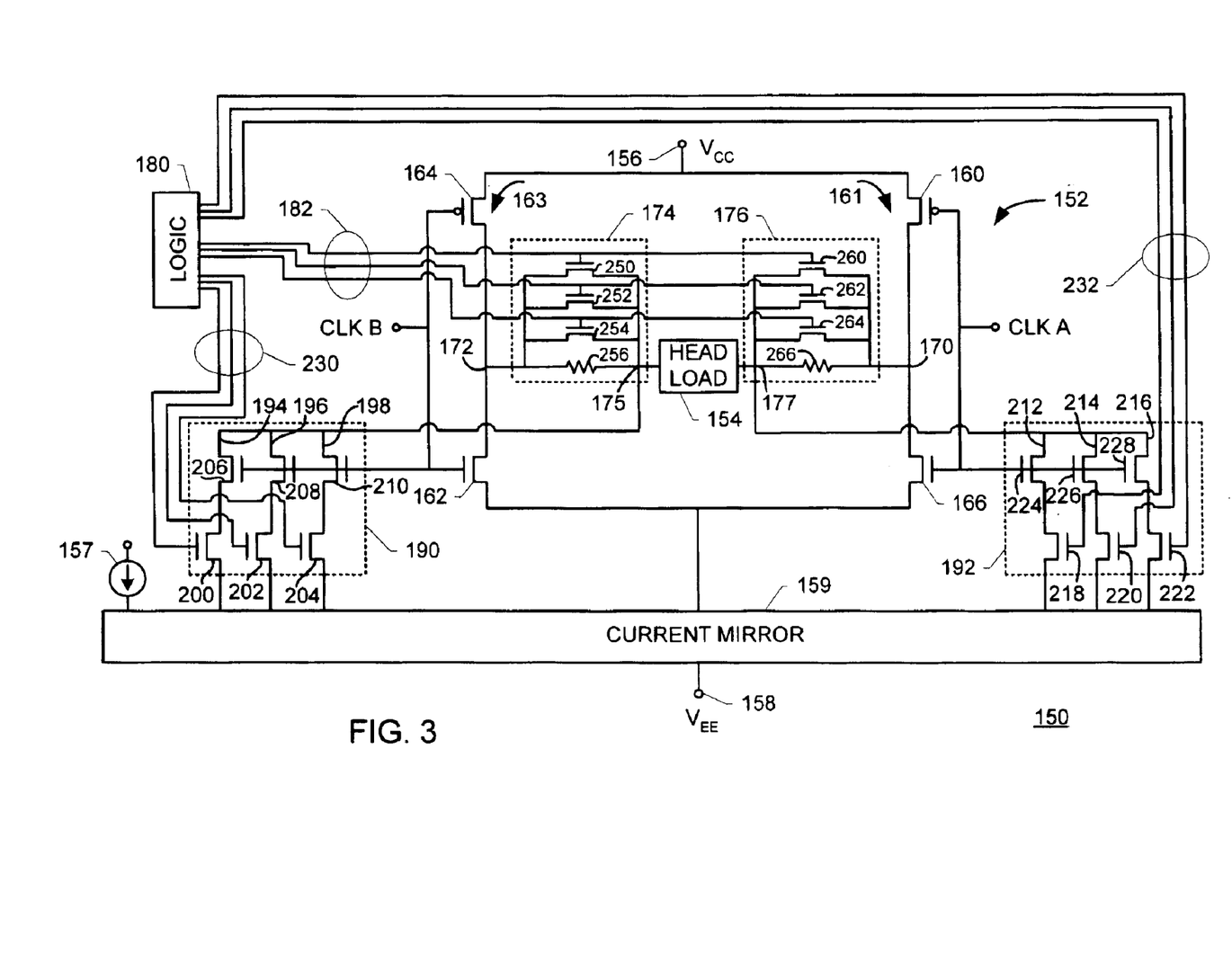
FIG. 3 is a simplified electrical schematic drawing of the preferred embodiment of the apparatus of the present invention.

FIG. 3 is a simplified electrical schematic drawing of the preferred embodiment of the apparatus of the present invention. In FIG. 3, a write drive system 150 includes a current directing circuit 152 coupled with a write head 154. Current directing circuit 152 is coupled between a first supply voltage $V_{CC}$ at a first supply locus 156 and a second supply voltage $V_{EE}$ at a second supply locus 158 via a current mirror unit 159. Current mirror unit 159 includes a reference current source 157. Preferably, second supply voltage $V_{EE}$ is a lower potential than first supply voltage $V_{CC}$. Current directing circuit 152 includes first switching elements 160, 162 and second switching elements 164, 166. First switching element 160 is coupled between first supply locus 156 and a circuit junction 170. First switching element 162 is coupled between second supply locus 158 and a circuit junction 172. Second switching element 164 is coupled between first supply locus 156 and circuit junction 172.

Second switching element 166 is coupled between second supply locus 158 and circuit junction 170. A first impedance unit 174 is coupled between circuit junction 172 and a first head locus 175. A second impedance unit 176 is coupled between circuit junction 170 and a second head locus 177. Write head 154 is coupled between head loci 175, 177.

First switching element 160 and second switching element 166 are driven by a clock signal CLK A. First switching element 160 and second switching element 166 are configured to respond oppositely to driving signals so that whenever one of first switching element 160 and second switching element 166 closes to establish an electrical path in response to signal CLK A, the other of first switching element 160 and second switching element 166 is open to interrupt an electrical path. First switching element 162 and second switching element 164 are driven by a clock signal CLK B. First switching element 162 and second switching element 164 are configured to respond oppositely to driving signals so that whenever one of first switching element 162 and second switching element 164 closes to establish an electrical path in response to signal CLK B, the other of first switching element 162 and second switching element 164 is open to interrupt an electrical path. In such manner, current directing circuit 152 effectively responds to clock signals CLK A and CLK B as though responding to two write signals applied to switching elements 160, 162, 164, 166.

Impedance units 174, 175 are preferably variable impedances responding to control signals provided from a logic unit 180 via a control lines 182 to establish operating impedances. Variable impedance is provided by impedance unit 174 by selectively gating one or more respective CMOS transistor elements 250, 252, 254 in electrical connection with a resistor 256. Transistor elements 250, 252, 254 may be configured to include similar resistances into an electrical circuit when gated, or different resistances. Transistor elements 250, 252, 254 are illustrated in FIG. 3 as being situated for selective parallel connection with resistor 256. Other connection arrangements may be established without departing from the scope of the present invention. Variable impedance is provided by impedance unit 176 by selectively gating one or more respective CMOS transistor elements 260, 262, 264 in a completed electrical circuit connection with a resistor 266. Transistor elements 260, 262, 264 may be configured to include similar resistances into a completed electrical circuit connection when gated, or different resistances. Transistor elements 260, 262, 264 are illustrated in FIG. 3 as being situated for selective parallel connection with resistor 266; but other connection arrangements may be established without departing from the scope of the present invention. Preferably logic unit 180 is a digital logic control unit that provides digital control signals. In such an embodiment an n-bit logic unit could distinguish up to $2^n$ control signals over each respective control line.

In an exemplary embodiment write drive system 150 first switching element 160 responds to a negative excursion of signal CLK A, and first switching element 162 responds to a positive excursion of signal CLK B to close and complete an electrical circuit. Thus, when signal CLK A is negative and signal CLK B is positive a first electrical path 161 is established from first supply locus 156 through first switching element 160, thorough second impedance unit 176, through write head 154, through first impedance unit 174 and through first switching element 162 to second supply locus 158 via current mirror unit 159. Further in the exemplary embodiment second switching element 164 responds to a negative excursion of signal CLK B, and second switching element 166 responds to a positive excursion of signal CLK A to close and complete an electrical circuit. Thus, when signal CLK B is negative and signal CLK A is positive a second electrical path 163 is established from first supply locus 156 through second switching element 164, through first impedance unit 174, through write head 154, through second impedance unit 176 and through second switching element 166 to second supply locus 158 via current mirror unit 159. Preferably, clock signals CLK A, CLK B are substantially 180 degrees out of phase so that whenever one of clock signals CLK A, CLK B is in a positive excursion, the other of clock signals CLK A, CLK B is in a negative excursion.

Write drive system 150 also includes a first current adjustment unit 190 coupled between first head locus 175 and second supply locus 158 via current mirror unit 159, and a second current adjustment unit 192 coupled between second head locus 177 and second supply locus 158 via current mirror unit 159. First current adjustment unit 190 is preferably embodied in a current digital-to-analog converter unit including a plurality of parallel circuit segments 194, 196, 198. Each respective circuit segment 194, 196, 198 includes a switch unit controlling electrical connection of a circuit element. Circuit segment 194 includes a switch unit 200 in series with a circuit element 206. Circuit segment 196 includes a switch unit 202 in series with a circuit element 208. Circuit segment 198 includes a switch unit 204 in series with a circuit element 210. First current adjustment unit 190 may include more than or less than three circuit segments; three circuit segments 194, 196, 198 are shown in FIG. 3 by way of illustration and not by way of limitation. Second current adjustment unit 192 is preferably embodied in a current digital-to-analog converter unit including a plurality of parallel circuit segments 212, 214, 216. Each respective circuit segment 212, 214, 216 includes a switch unit controlling electrical connection of a circuit element. Circuit segment 212 includes a switch unit 218 in series with a circuit element 224. Circuit segment 214 includes a switch unit 220 in series with a circuit element 226. Circuit segment 216 includes a switch unit 222 in series with a circuit element 228. Second current adjustment unit 192 may include more than or less than three circuit segments; three circuit segments 212, 214, 216 are shown in FIG. 3 by way of illustration and not by way of limitation.

Circuit elements 206, 208, 210 are illustrated in FIG. 3 as being embodied in CMOS transistor devices that are gated by clock signal CLK B to establish connection with first head locus 175 only during an appropriate excursion of clock signal CLK B for establishing second electrical path 163. Full electrical inclusion of a respective circuit segment 194, 196, 198 in electrical connection between first head locus 175 and second supply locus 158 is controlled by respective switch units 200, 202, 204. Circuit elements 224, 226, 228 are illustrated in FIG. 3 as being embodied in CMOS transistor devices that are gated by clock signal CLK A to establish connection with second head locus 177 only during an appropriate excursion of clock signal CLK A for establishing first electrical path 161. Full electrical inclusion of a respective circuit segment 212, 214, 216 in electrical connection between second head locus 177 and second supply locus 158 is controlled by respective switch units 218, 220, 222.

Switch units 200, 202, 204 are illustrated in FIG. 3 as being embodied in CMOS transistor devices that are selectively gated in response to control signals provided from logic unit 180 via a control lines 230. Switch units 218, 220, 222 are illustrated in FIG. 3 as being embodied in CMOS transistor devices that are selectively gated in response to control signals provided from logic unit 180 via a control lines 232. Preferably logic unit 180 is a digital logic control unit that provides digital control signals. In such an embodiment an n-bit logic unit could distinguish up to $2^n$ control signals over each respective control line.

Thus, each of control lines 230, 232 may address and control individual switch units by a 2-bit digital control unit (i.e., $2^2=4$ control identities controlling three switch units). Alternatively, control lines 230, 232 could be combined into a single control line and each respective switch unit 200, 202, 204, 218, 220, 222 could be addressed and controlled individually by a 3-bit digital controller. In another alternate embodiment, predetermined combinations of positions of switch units 200, 202, 204, 218, 220, 222 and settings for transistor elements 250, 252, 254, 260, 262, 264 may be established to effect electrical inclusion in circuitry of predetermined combinations of circuit elements and impedance levels in operating write driver unit 50 for control by a two-bit digital control unit. Selective activation of switch units 200, 202, 204, 218, 220, 222 in response to control signals from logic unit 180 effects selective inclusion of respective circuit elements 206, 208, 210, 224, 226, 228. Varying the arrangement of circuit elements 206, 208, 210, 224, 226, 228 coupled between first head locus 175 or second head locus 177 and second supply locus 158 varies the current draw through electrical paths 161, 163 depending upon the states of signals CLK A, CLK B.

Logic unit 180 may employ control signals delivered via control lines 182 (to impedance units 174, 176) and control lines 230, 232 (to current adjustment units 190, 192) to configure write drive system 150 to present predetermined operational parameters for inclusion of write drive system 150 in a product. Providing variable configuration for write drive system 150 permits a manufacturer to make a single part that can be configured (using logic unit 180) to accommodate operational requirements of a variety of customers desiring to employ write drive system 150 in products. An ability to manufacture a single part that can accommodate a variety of applications in products provides the part manufacturer with economies of scale advantages including less inventory, lower component part counts and other cost saving advantages.

Varying increments of impedance provided by transistor elements 250, 252, 254 in impedance unit 174 and transistor elements 260, 262, 264 in impedance unit 176 in response to control signals from logic unit 180 provides flexibility in configuring write drive system 150. That is, it is not required that incremental steps in variation of impedance provided by selectively gating transistor elements 250, 252, 254, 260, 262, 264 be equal-magnitude steps. Similarly, varying increments of current flow provided by circuit elements 206, 208, 210, 224, 226, 228 in response to control signals from logic unit 180 provides flexibility in configuring write drive system 150. That is, it is not required that incremental steps in variation of current flow provided by adjusting arrangements of circuit elements 206, 208, 210, 224, 226, 228 be equal-magnitude steps.

The requirements for boost current $I_{BST}$ and output resistance $R_{OUT}$ urging parameters $R_{OUT}$, $I_{BST}$ in opposite directions to seek to achieve a particular operating value for write current $I_W$ may be accommodated by logic unit 180 selectively operating switch units 200, 202, 204, 218, 220, 222 to selectively include circuit elements 206, 208, 210, 224, 226 228 in write drive system 150 and by logic unit 180 selectively gating transistor elements 250, 252, 254, 260, 262, 264 to set impedance units 174, 176 to configure write drive system 150 for optimal performance using a particular values of write current $I_W$. That is, logic unit 180 may establish circuit parameters of write drive system 150 to accommodate lower write current $I_W$ that urges higher output resistance $R_{OUT}$ and lower boost current $I_{BST}$, or to accommodate higher write current $I_W$ that urges lower output resistance $R_{OUT}$ and higher boost current $I_{BST}$. Complete control of parameters $R_{OUT}$, $I_{BST}$ does not need to be effected to configure write drive system 150 for optimal performance using a variety of values of write current $I_W$. Logic unit 180 only needs to control circuit parameter settings in which one of parameters $R_{OUT}$, $I_{BST}$ is increased while the other of parameters $R_{OUT}$, $I_{BST}$ is decreased, or in which one of parameters $R_{OUT}$, $I_{BST}$ is decreased while the other of parameters $R_{OUT}$, $I_{BST}$ is increased. Logic unit 180 does not need to be capable of increasing or decreasing both of parameters $R_{OUT}$, $I_{BST}$ together. Providing a single control apparatus such as logic unit 180 in operational cooperation with gating transistor elements 250, 252, 254, 260, 262, 264 to set impedance units 174, 176 and with switch units 200, 202, 204, 218, 220, 222 to selectively include circuit elements 206, 208, 210, 224, 226 228) for affecting selected circuit parameters to configure write drive system 150 for desired operational characteristics lowers parts count for the write apparatus while increasing its flexibility to meet varied requirements of customer-producers. Lower parts count yields several advantages, including by way of example and not by way of limitation, occupying less board space, increased reliability (i.e., fewer parts to break down), lesser power consumption and other efficiencies.

Figure 4:
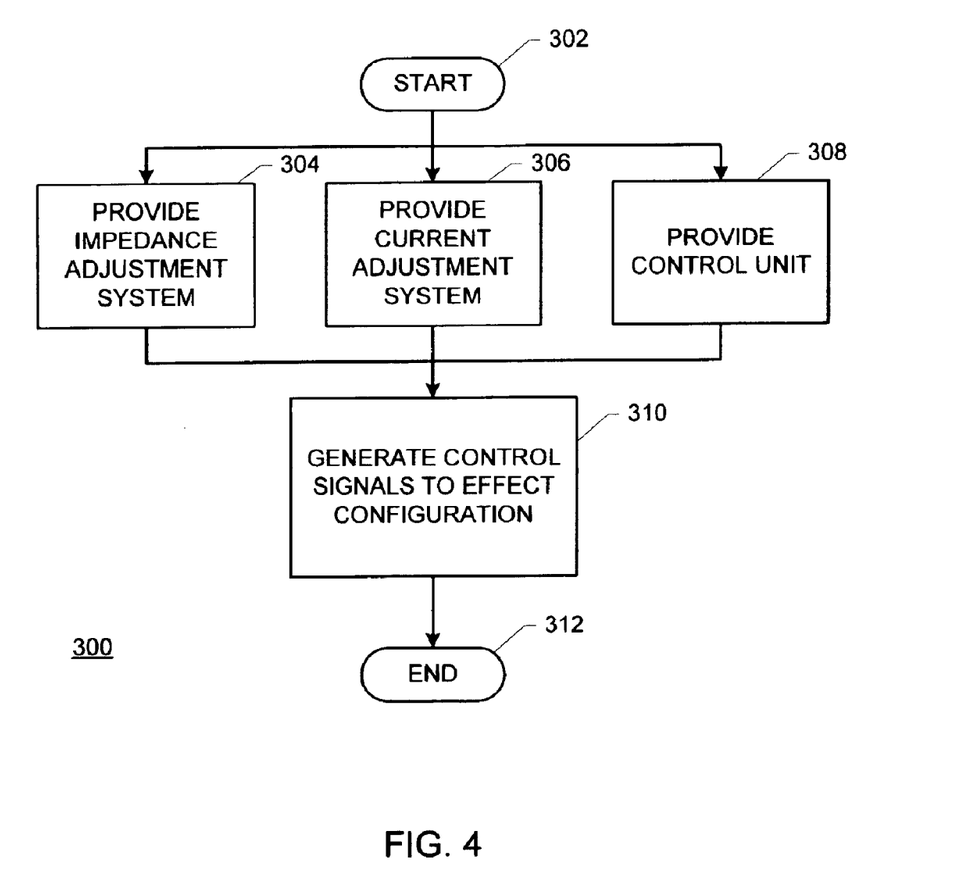
FIG. 4 is a flow chart illustrating the method of the present invention.

FIG. 4 is a flow chart illustrating the method of the present invention. In FIG. 4, a method 300 is represented for configuring an apparatus according to predetermined operational characteristics for applying a first write signal and a second write signal for driving a write head coupled between a first head locus and a second head locus to effect writing information to a memory device. The apparatus includes a current directing circuit for directing a write current from a first voltage supply through a first circuit path including the write head in response to the first write signal, and directing the write current from the first voltage supply through a second current path including the write head in response to the second write signal. Method 300 begins at a START locus 302. Method 300 continues with the step of, in no particular order: (1) Providing an impedance adjustment system, as indicated by a block 302. The impedance adjustment system includes a first impedance unit and a second impedance unit. The first impedance unit includes at least one first impedance device configured for including at least one selected first impedance unit of a plurality of first impedance units within the first current path. The second impedance unit includes at least one second impedance device configured for including at least one selected second impedance unit of a plurality of second impedance units within the second current path. (2) Providing a current adjustment system, as indicated by a block 306. The current adjustment system includes a first current boost unit and a second current boost unit. The first current boost unit is coupled between the first head locus and a second supply voltage lower than the first supply voltage. The first current boost unit is configured for selectively including at least one selected first circuit element of a plurality of first circuit elements between the first head locus and the second supply voltage. The second current boost unit is coupled between the second head locus and the second supply voltage. The second current boost unit includes at least one second circuit element configured for selectively including at least one selected second circuit element of a plurality of second circuit elements between the second head locus and the second supply voltage. (3) Providing a control unit coupled with at least one of the impedance adjustment system and the current adjustment system, as indicated by a block 308. Method 300 continues with operating the control unit to generate control signals for effecting the selective including for at least one of the impedance adjustment system and the current adjustment system to effect the configuring, as indicated by a block 310. Method 300 terminates at an END locus 312.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for use in applying write signals for driving a write head coupled between a first head locus and a second head locus to effect writing information to a memory device; said write signals including a first write signal and a second write signal; the apparatus being configured for varying circuit parameters according to predetermined operational characteristics; the apparatus comprising:

(a) a current directing circuit; said current directing circuit being coupled with a first supply voltage and receiving said write signals; said current directing circuit directing a write current through a first circuit path including said write head in response to said first write signal; said current directing circuit directing said write current through a second current path including said write head in response to said second write signal;

(b) at least one of:

(1) an impedance adjustment system; said impedance adjustment system including a first impedance unit and a second impedance unit; said first impedance unit including at least one first impedance device configured for including at least one selected first impedance unit of a plurality of first impedance units within said first current path; said second impedance unit including at least one second impedance device configured for including at least one selected second impedance unit of a plurality of second impedance units within said second current path; and (2) a current adjustment system; said current adjustment system including a first current boost unit and a second current boost unit; said first current boost system being coupled between said first head locus and a second supply voltage lower than said first supply voltage; said first current boost system being configured for selectively including at least one selected first circuit element of a plurality of first circuit elements between said first head locus and said second supply voltage; said second current boost system being coupled between said second head locus and said second supply voltage; said second current boost system including at least one second circuit element configured for selectively including at least one selected second circuit element of a plurality of second circuit elements between said second head locus and said second supply voltage; and (c) a control unit coupled with at least one of said impedance adjustment system and said current adjustment system; said control unit generating control signals for effecting said selective including for at least one of said impedance adjustment system and said current adjustment system to effect said varying.

2. An apparatus for use in applying write signals for driving a write head as recited in claim 1 wherein the apparatus includes both of said impedance adjustment system and said current adjustment system.

3. An apparatus for use in applying write signals for driving a write head as recited in claim 2 wherein said plurality of first impedance units comprises a plurality of first resistance elements switchably coupled in parallel between said first supply voltage and said first head locus, and wherein said plurality of second impedance units comprises a plurality of second resistance elements switchably coupled in parallel between said first supply voltage and said second head locus.

4. An apparatus for use in applying write signals for driving a write head as recited in claim 3 wherein each said first resistance element and each said second resistance element is a resistive transistor element; each respective said resistive transistor element contributing resistance to an electrical path in which it is included according to a size of said respective resistive transistor element.

5. An apparatus for use in applying write signals for driving a write head as recited in claim 2 wherein said plurality of first circuit elements comprises a plurality of first current elements switchably coupled between said first head locus and said second supply voltage, and wherein said plurality of second circuit elements comprises a plurality of second current elements switchably coupled between said second head locus and said second supply voltage.

6. An apparatus for use in applying write signals for driving a write head as recited in claim 5 wherein each said first current element and each said second current element is a current-passing transistor element; each respective said current-passing transistor element permitting current to pass in an electrical path in which it is included according to a size of said respective current-passing transistor element.

7. An apparatus for use in applying write signals for driving a write head as recited in claim 1 wherein said plurality of first impedance units comprises a plurality of first resistance elements switchably coupled in parallel between said first supply voltage and said first head locus, and wherein said plurality of second impedance units comprises a plurality of second resistance elements switchably coupled in parallel between said first supply voltage and said second head locus.

8. An apparatus for use in applying write signals for driving a write head as recited in claim 7 wherein each said first resistance element and each said second resistance element is a resistive transistor element; each respective said resistive transistor element contributing resistance to an electrical path in which it is included according to a size of said respective resistive transistor element.

9. An apparatus for use in applying write signals for driving a write head as recited in claim 1 wherein said plurality of first circuit elements comprises a plurality of first current elements switchably coupled between said first head locus and said second supply voltage, and wherein said plurality of second circuit elements comprises a plurality of second current elements switchably coupled between said second head locus and said second supply voltage.

10. An apparatus for use in applying write signals for driving a write head as recited in claim 9 wherein each said first current element and each said second current element is a current-passing transistor element; each respective said current-passing transistor element permitting current to pass in an electrical path in which it is included according to a size of said respective current-passing transistor element.

11. An apparatus for use in applying a first write signal and a second write signal for driving a write head coupled between a first head locus and a second head locus to effect writing information to a memory device; the apparatus being configured for varying circuit parameters; the apparatus comprising:

(a) a current directing circuit directing a write current from a first voltage supply through a first circuit path including said write head in response to said first write signal, and directing said write current from said first voltage supply through a second current path including said write head in response to said second write signal;

(b) an impedance adjustment system including a first impedance unit and a second impedance unit; said first impedance unit including at least one first impedance device configured for including at least one selected first impedance unit of a plurality of first impedance units within said first current path; said second impedance unit including at least one second impedance device configured for including at least one selected second impedance unit of a plurality of second impedance units within said second current path;

(c) a current adjustment system; said current adjustment system including a first current boost unit and a second current boost unit; said first current boost system being coupled between said first head locus and a second supply voltage lower than said first supply voltage; said first current boost system being configured for selectively including at least one selected first circuit element of a plurality of first circuit elements between said first head locus and said second supply voltage; said second current boost system being coupled between said second head locus and said second supply voltage; said second current boost system including at least one second circuit element configured for selectively including at least one selected second circuit element of a plurality of second circuit elements between said second head locus and said second supply voltage; and (d) a control unit coupled with at least one of said impedance adjustment system and said current adjustment system; said control unit generating control signals for effecting said selective including for at least one of said impedance adjustment system and said current adjustment system to effect said varying.

12. An apparatus for use in applying write signals for driving a write head as recited in claim 11 wherein said plurality of first impedance units comprises a plurality of first resistance elements switchably coupled in parallel between said first supply voltage and said first head locus, and wherein said plurality of second impedance units comprises a plurality of second resistance elements switchably coupled in parallel between said first supply voltage and said second head locus.

13. An apparatus for use in applying write signals for driving a write head as recited in claim 12 wherein said plurality of first circuit elements comprises a plurality of first current elements switchably coupled between said first head locus and said second supply voltage, and wherein said plurality of second circuit elements comprises a plurality of second current elements switchably coupled between said second head locus and said second supply voltage.

14. An apparatus for use in applying write signals for driving a write head as recited in claim 13 wherein each said first resistance element and each said second resistance element is a resistive transistor element; each respective said resistive transistor element contributing resistance to an electrical path in which it is included according to a size of said respective resistive transistor element.

15. An apparatus for use in applying write signals for driving a write head as recited in claim 14 wherein each said first current element and each said second current element is a current-passing transistor element; each respective said current-passing transistor element permitting current to pass in an electrical path in which it is included according to a size of said respective current-passing transistor element.

16. A method for configuring an apparatus according to predetermined operational characteristics for applying a first write signal and a second write signal for driving a write head coupled between a first head locus and a second head locus to effect writing information to a memory device; the apparatus including a current directing circuit for directing a write current from a first voltage supply through a first circuit path including said write head in response to said first write signal, and directing said write current from said first voltage supply through a second current path including said write head in response to said second write signal; the method comprising the steps of:
(a) in no particular order:
  (1) providing an impedance adjustment system including a first impedance unit and a second impedance unit; said first impedance unit including at least one first impedance device configured for including at least one selected first impedance unit of a plurality of first impedance units within said first current path; said second impedance unit including at least one second impedance device configured for including at least one selected second impedance unit of a plurality of second impedance units within said second current path;
  (2) providing a current adjustment system; said current adjustment system including a first current boost unit and a second current boost unit; said first current boost unit being coupled between said first head locus and a second supply voltage lower than said first supply voltage; said first current boost unit being configured for selectively including at least one selected first circuit element of a plurality of first circuit elements between said first head locus and said second supply voltage; said second current boost unit being coupled between said second head locus and said second supply voltage; said second current boost unit including at least one second circuit element configured for selectively including at least one selected second circuit element of a plurality of second circuit elements between said second head locus and said second supply voltage; and
  (3) providing a control unit coupled with at least one of said impedance adjustment system and said current adjustment system;
(b) operating said control unit to generate control signals for effecting said selective including for at least one of said impedance adjustment system and said current adjustment system to effect said configuring.

17. A method for configuring an apparatus according to predetermined operational characteristics for applying a first write signal and a second write signal for driving a write head as recited in claim 16 wherein said plurality of first impedance units comprises a plurality of first resistance elements switchably coupled in parallel between said first supply voltage and said first head locus, and wherein said plurality of second impedance units comprises a plurality of second resistance elements switchably coupled in parallel between said first supply voltage and said second head locus.

18. A method for configuring an apparatus according to predetermined operational characteristics for applying a first write signal and a second write signal for driving a write head as recited in claim 17 wherein said plurality of first circuit elements comprises a plurality of first current elements switchably coupled between said first head locus and said second supply voltage, and wherein said plurality of second circuit elements comprises a plurality of second current elements switchably coupled between said second head locus and said second supply voltage.

19. A method for configuring an apparatus according to predetermined operational characteristics for applying a first write signal and a second write signal for driving a write head as recited in claim 18 wherein each said first resistance element and each said second resistance element is a resistive transistor element; each respective said resistive transistor element contributing resistance to an electrical path in which it is included according to a size of said respective resistive transistor element.

20. A method for configuring an apparatus according to predetermined operational characteristics for applying a first write signal and a second write signal for driving a write head as recited in claim 19 wherein each said first current element and each said second current element is a current-passing transistor element; each respective said current-passing transistor element permitting current to pass in an electrical path in which it is included according to a size of said respective current-passing transistor element.

* * * * *